April 8, 1930.  M. L. GEORGOPOULOS  1,753,371
BREAD SLICER
Filed July 10, 1928   2 Sheets-Sheet 1

Inventor:
Michael L. Georgopan

Witness:
A. J. Gumprecht

April 8, 1930.  M. L. GEORGOPOULOS  1,753,371
BREAD SLICER
Filed July 10, 1928   2 Sheets-Sheet 2
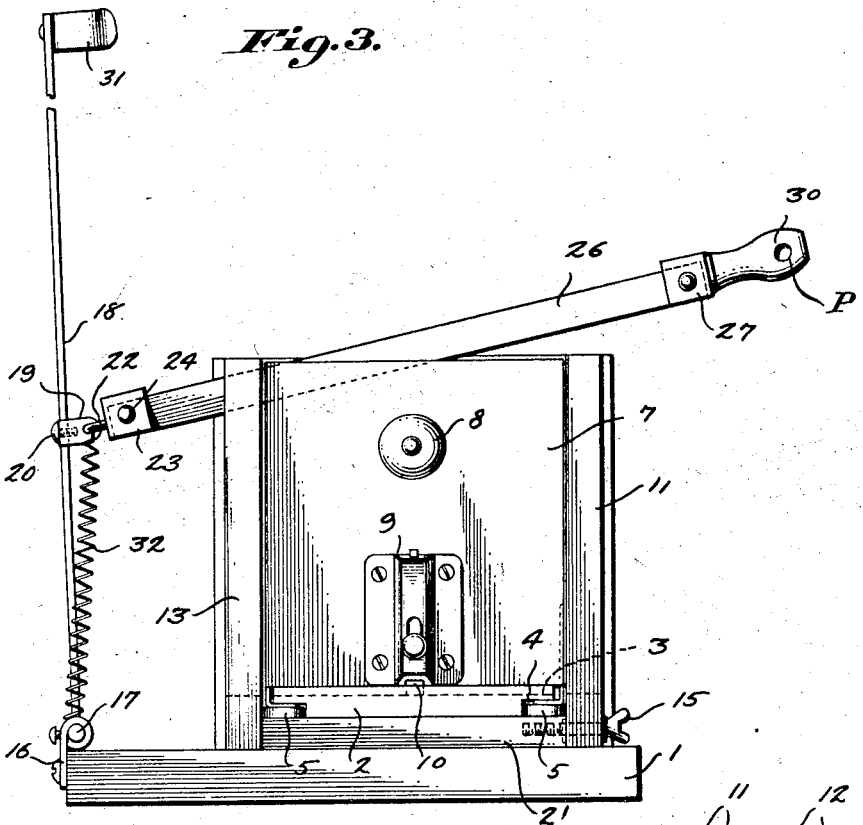
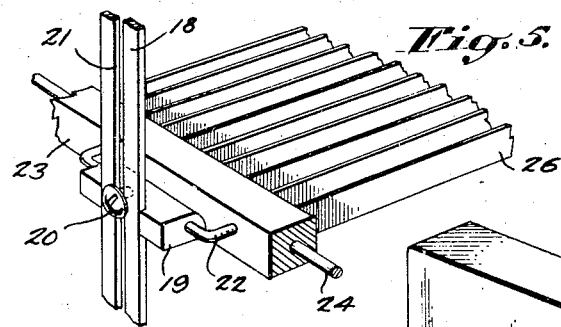
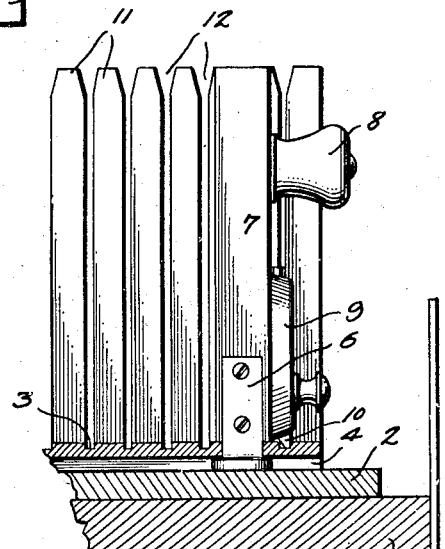
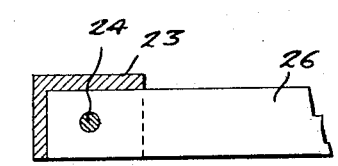
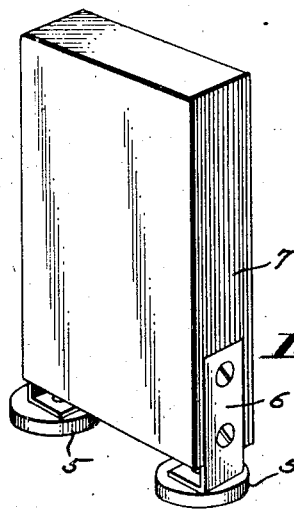
Inventor:
Michael L. Georgopoulos Patented Apr. 8, 1930

1,753,371

UNITED STATES PATENT OFFICE

MICHAEL L. GEORGOPOULOS, OF WEST PALM BEACH, FLORIDA

BREAD SLICER

Application filed July 10, 1928. Serial No. 291,566.

This invention relates to a device for holding a loaf of bread and slicing the same uniformly with the greatest ease and rapidity, the device being adapted for manufacture in wood or metal, and being of a simplified structure is efficient in use and cheap to manufacture.

An object of the invention is to provide a device of this character in which the bread may be positioned, and which may be adjusted to secure loaves of bread of different widths and lengths, in which the knife guides are firmly and positively positioned so that fresh bread, which is usually of a yielding nature, may be securely held during the slicing operation; the construction being such that portions of the bread support may be easily and rapidly removed after the bread is sliced so that the bread may be removed from the device.

A further object is to provide a construction in which the slicing means may be positioned at one end of the loaf, and there operated to cut a plurality of slices at one time, and raised and moved to another selected position for additional slicing.

A further object is to provide means for guiding the pivoted frame which carries the slicing knives back and forth through the bread as it is lowered to slice, the free end of the slicing frame being adapted for manual operation or for the application of a power unit.

With the above and other objects in view which will appear as the description proceeds, the invention resides in the combination and arrangement of parts, and in the details of construction hereinafter described and claimed, it being understood that changes in the precise embodiment of the invention herein disclosed may be made within the scope of what is claimed without departing from the spirit of the invention.

In the accompanying drawings:
Figure 1 is a side elevation of my device showing the knife frame in partially raised position;

Figure 3 is an end elevation of my preferred form;

Figure 4 is a fragmental section of one end of my device showing an adjustable end gate;

Figure 5 is a detail of the arrangement whereby my knife frame is slidably mounted for vertical adjustment and pivotally mounted for raising and lowering;

Figure 6 is a detail perspective of my adjustably positioned end gate; and

Figure 7 is a detail of the preferred structure of mounting the knives in the pivoted frame.

Figure 1:
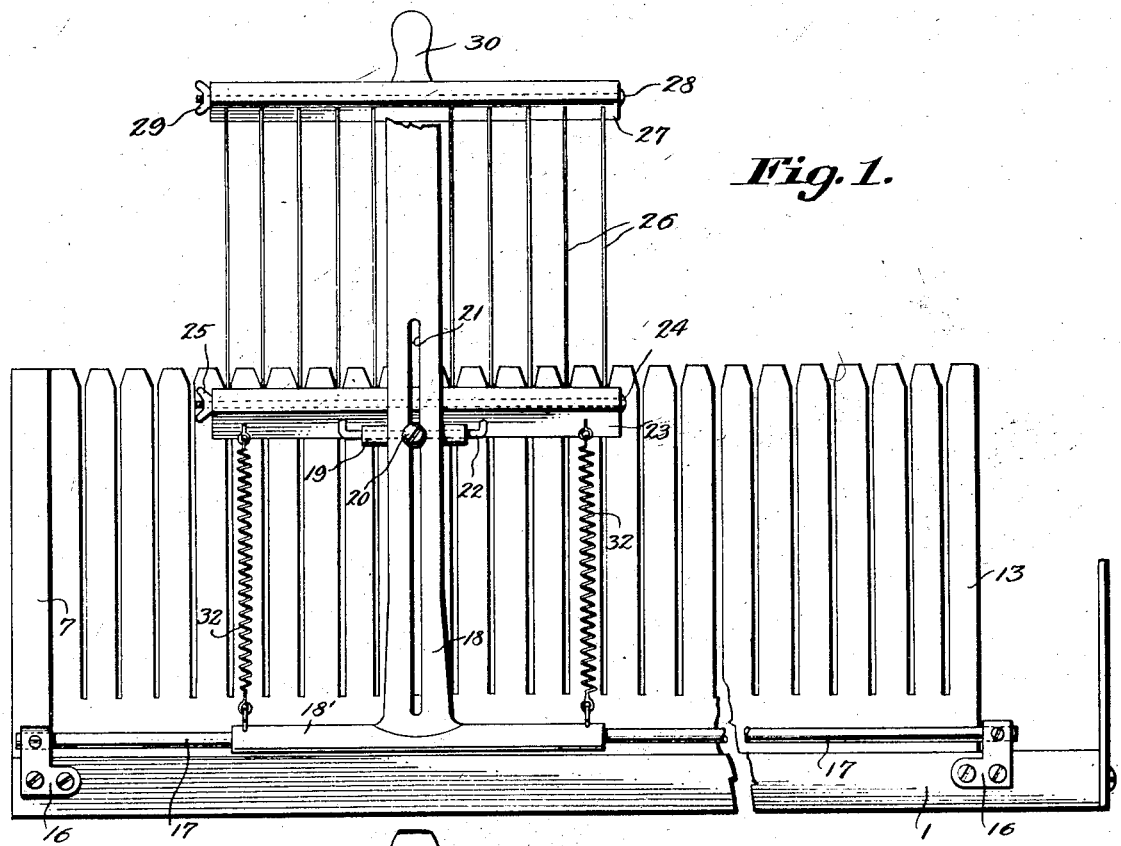
Figure 2:
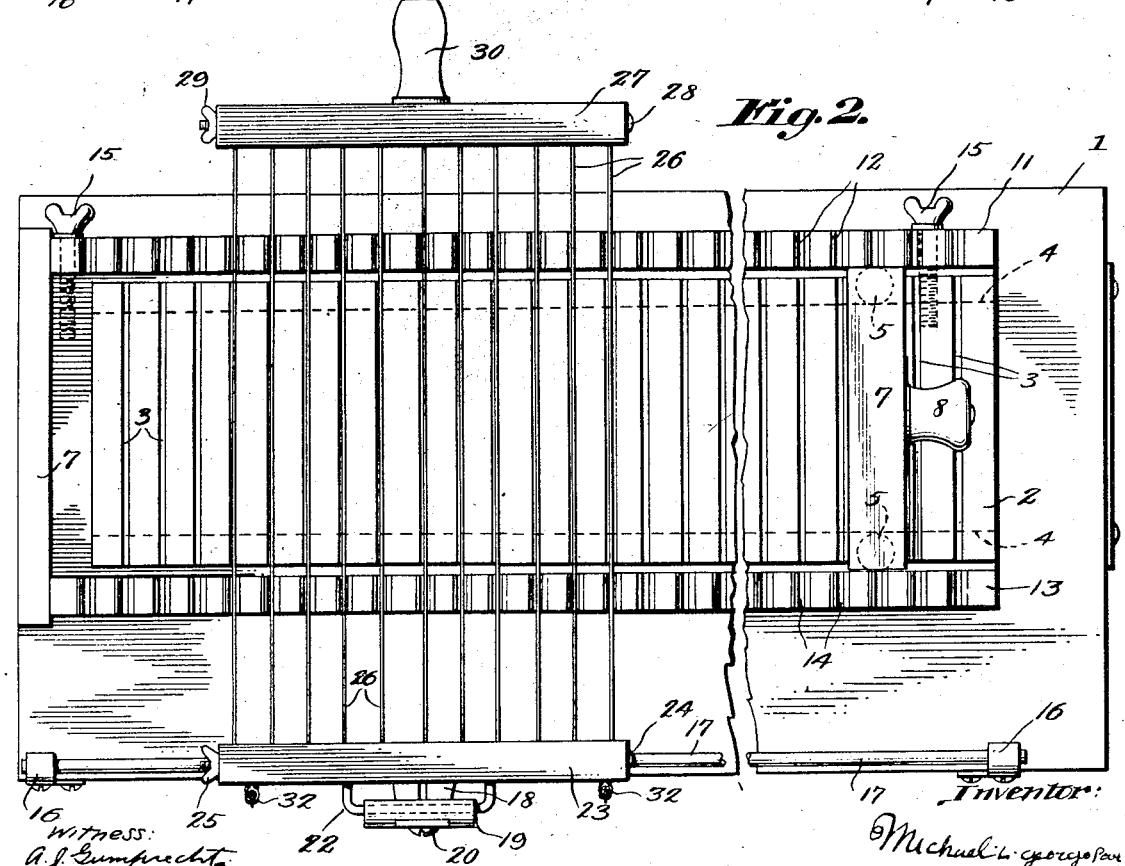
Figure 2 is a plan view thereof.

Referring to the drawings my device as illustrated comprises a base 1 upon which is secured a sub-base 2 having lateral grooves or slots 3 so that the knives may cut clear through the bottom crust of the bread when positioned on the sub-base.

Grooves or rabbets 4 in the edges of the sub-base act as guides or trackways to accommodate the rollers 5 secured by plates 6 to the end gate 7 which may be moved from one end to the other of the sub-base by seizing the handle 8 whereby the end gate may be positioned against the end of the loaf of bread. A latch 9 having a detent 10 is adapted to secure the end gate in adjusted position.

The sides of the bread are supported by members 11, having slots 12 for knife guidance, and by members 13 having slots 14 therein for knife guidance. The side member 11 may be adjusted toward or away from the sub-base 2 for the accommodation of narrow loaves by the manipulation of winged nut and screws 15 secured thereto and into a primary sub-base 2′.

Mounted at one side of the base on brackets 16 is a longitudinal rail 17 upon which is slidably mounted a sleeve 18′ from which rises a bracket 18 having slot 21 therein. A headed screw 20 supports a member 19 in which is pivoted as at 22 a knife carrying member 23. Securing means comprising a wire 24 passes through this member, and secures the knife blades 26 therein. The free ends of the knife blades are mounted in the cross-member 27 and secured therein by the wire 28. The knives are removable and may be sharpened and replaced and secured in position by the wing nuts 25 and 29.

A handle 30 is provided whereby the operator may rock the knife frame. A catch 31 secured to the bracket 18 is adapted to cooperate with the handle to hold it in raised position when not in use. An aperture P is provided in the handle or other appropriate place on the knife frame for the attachment of reciprocating means for a power unit, not shown.

Coil springs 32 extend from the sleeve 18' to the knife frame 23 and are adapted to draw the knife frame downwardly at its pivoted end to assist the operator in slicing with this device.

It will be appreciated that a loaf of bread of almost any commercial size may be placed within the slicing box of my device, the sides and ends rapidly moved to contact therewith and the knife frame moved to one end of the device. The usual downward slicing back and forth movement used in cutting one slice of bread will with my device cut a plurality of slices, the reciprocating frame and pivoted support materially aiding in the slicing operation, and allowing the frame to be rapidly raised and guided through the cuts just made by the first operation. A lateral adjustment along the rail 17 to a new position is quickly made and the frame with its plurality of knives is then accurately guided for a second cut.

While in the foregoing I have described a specific structure and have mentioned only certain modifications, it will be appreciated that in practice I do not limit myself to such specific details as herein set forth, but may resort to any practical modifications falling within the scope of the claims.

What I claim and desire to secure by Letters Patent of the United States is:

1. A bread slicer having a slotted base, knife guides mounted on the base and having knife slots aligned with the first mentioned slots, and slicing knives mounted for sliding adjustment to a selected series of slots.

2. A bread slicer having a slotted base, knife guides mounted on the base and having knife slots aligned with the first mentioned slots and slicing knives mounted for sliding adjustment to a selected series of slots and pivoted for movement through the knife guides to lower into the slotted base.

3. A bread slicer comprising a slotted base, slotted adjustable supports for the bread, slicing means pivotally adjustable adjacent the supports, resilient means to releasably retain knives in raised position, and means to positively lower the knives when slicing, said means comprising coil springs engaging said slicing means at one end and operatively connected to the base at the other end, whereby to permit of exerting tension on the knives continuously during the slicing operation whether the spring is in a vertical or a different plane.

4. A bread slicer comprising a base having knife guides, a knife carrying frame mounted on the base for longitudinal adjustment thereupon relative to the guides and pivoted for lateral movement across the base, and positive means to lower the knife carrying frame through the guides.

5. A bread slicer comprising a base, laterally adjustable slotted side supports for the bread, said side supports having longitudinal grooves near their base portions, adjustable end support for the bread, said end support having rollers slidably engageable in the longitudinal grooves in the base of the side supports to permit of quicker and convenient longitudinal adjustment of the end support of the bread, and slicing knives adjustable to the slotted side supports.

In testimony whereof I affix my signature.

MICHAEL L. GEORGOPOULOS.